(12) United States Patent
Kessler et al.

(10) Patent No.: US 9,205,711 B2
(45) Date of Patent: Dec. 8, 2015

(54) METHOD FOR LOCATING THE POSITION OF WHEELS OF A VEHICLE

(75) Inventors: Sébastien Kessler, Toulouse (FR); Mohamed Cheikh, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 594 days.

(21) Appl. No.: 13/578,863

(22) PCT Filed: Mar. 14, 2011

(86) PCT No.: PCT/EP2011/001236
§ 371 (c)(1),
(2), (4) Date: Aug. 27, 2012

(87) PCT Pub. No.: WO2011/113560
PCT Pub. Date: Sep. 22, 2011

(65) Prior Publication Data
US 2012/0316829 A1 Dec. 13, 2012

(30) Foreign Application Priority Data
Mar. 19, 2010 (FR) ...................................... 10 01093

(51) Int. Cl.
*G06F 15/00* (2006.01)
*B60C 23/04* (2006.01)

(52) U.S. Cl.
CPC .................................. *B60C 23/0416* (2013.01)

(58) Field of Classification Search
CPC .. B60C 23/0416; B60C 23/04; B60C 23/0433
See application file for complete search history.

(56) References Cited

U.S. PATENT DOCUMENTS

| 6,181,241 B1 * | 1/2001 | Normann et al. ............. 340/447 |
| 6,385,511 B1 | 5/2002 | Fondeur et al. |

(Continued)

FOREIGN PATENT DOCUMENTS

| DE | 101 35 936 | 2/2003 |
| EP | 0 931 679 | 7/1999 |
| FR | 2 819 336 | 7/2002 |

OTHER PUBLICATIONS

International Search Report dated Apr. 28, 2011, corresponding to PCT/EP2011/001236.

*Primary Examiner* — Mohamed Charioui
*Assistant Examiner* — John Kuan
(74) *Attorney, Agent, or Firm* — Young & Thompson

(57) ABSTRACT

A method for localization the position of wheels of a vehicle includes: storing, for each wheel, an image of the intensity of the signal originating from an electronic module fitted to the wheel; controlling the emission by each electronic module of a sequence of n signals emitted with predetermined time intervals; computing for each sequence of n signals, the temporal variation of the correlation coefficients between each signal of the sequence and each of the stored images; computing the peak of correlation of the correlation coefficients of each of the n signals and the temporal position over a wheel revolution of each of the n peaks of correlation; and selecting, for each stored image, the wheel at the origin of the emission of sequences having the highest peaks of correlation associated with time intervals corresponding to the time intervals of emission of the n signals of the sequences.

6 Claims, 1 Drawing Sheet

(56) References Cited

U.S. PATENT DOCUMENTS

Figure 1:
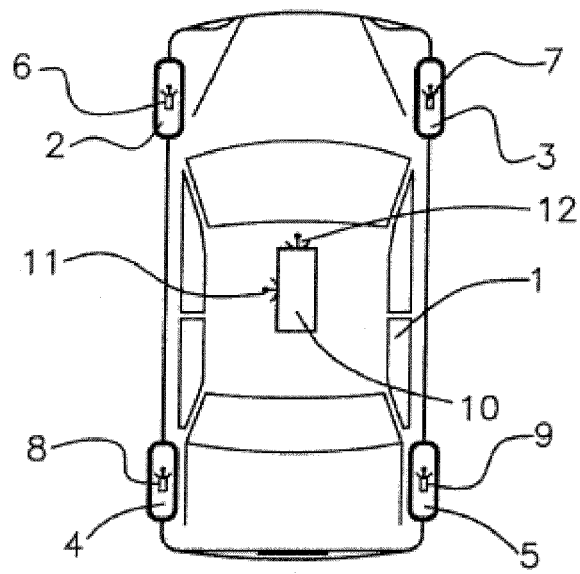

| | | | |
|---|---|---|---|
| 6,489,888 B1 * | 12/2002 | Honeck et al. | 340/442 |
| 7,574,293 B2 * | 8/2009 | Vredevoogd et al. | 701/36 |
| 7,750,798 B2 * | 7/2010 | Mori | 340/447 |
| 2003/0020604 A1 | 1/2003 | Fischer et al. | |
| 2003/0107481 A1 * | 6/2003 | Sawafuji | 340/442 |
| 2005/0187667 A1 | 8/2005 | Vredevoogd et al. | |
| 2008/0231436 A1 * | 9/2008 | Costes | 340/441 |
| 2009/0002146 A1 | 1/2009 | Lin | |
| 2009/0295641 A1 * | 12/2009 | Gerardiere | 342/451 |

\* cited by examiner

METHOD FOR LOCATING THE POSITION OF WHEELS OF A VEHICLE

BACKGROUND OF THE INVENTION

1. Field of the Invention

The invention relates to a method for locating the position of wheels of a vehicle, said wheels being fitted with an electronic module adapted to transmit, to a central unit mounted on the vehicle, signals representative of operating parameters of each wheel.

2. Description of the Related Art

More and more motor vehicles, for safety reasons, have monitoring systems comprising sensors mounted on each of the wheels of the vehicle that are dedicated to the measurement of parameters, such as pressure or temperature of the tires fitted to these wheels, and designed to inform the driver of any abnormal variation of the measured parameter.

These monitoring systems are conventionally equipped with an electronic module, mounted on each of the wheels of the vehicle, incorporating, in addition to the aforementioned sensors, a microprocessor and a radio transmitter, and a central unit for receiving the signals transmitted by the transmitters, comprising a computer incorporating a radio receiver.

One of the problems of such monitoring systems which is necessary to resolve lies in the obligation to associate with each signal received by the receiver of the central unit an item of information relating to the location of the electronic module and hence of the wheel at the origin of this signal, this obligation lasting throughout the service life of the vehicle, that is to say having to be complied with even after changes of wheels or more simply inversions of the position of these wheels.

Currently, a first localization method consists in incorporating an accelerometer in each electronic module and in using a localization technique based on statistical methods consisting in comparing the accelerations of the various wheels in order to obtain an item of information on the respective position of each of said wheels.

This localization method is not however very efficient because it requires notably a considerable running time in order to achieve a discrimination between the various wheels.

A second localization method consists in using at least three low-frequency antennas each positioned close to one of the wheels of the vehicle, and in carrying out a localization procedure consisting in exciting successively each of the antennas by the transmission of a low-frequency magnetic field.

According to this procedure, the electronic module mounted on the wheel situated close to the excited antenna transmits, in response to and in the direction of the central unit, a low-frequency signal comprising a code for identifying said module so that the successive excitation of the various antennas leads to the localization of the electronic modules mounted on the wheels next to these antennas.

The main advantage of such a method lies in the fact that the localization procedure is very rapid and leads to a virtually instantaneous localization after the vehicle has started.

On the other hand, this solution is extremely costly because it requires fitting the vehicle with at least three antennas with all the attendant disadvantages: connecting cables, control amplifiers, etc.

A third localization method consists in determining the position of the wheels based on a comparison of the intensity of the signals received by the central unit from each transmitter. As is notably described in patent EP 0 931 679, this method consists:

in a preliminary phase, in programming the central unit so as to generate, based on the range of amplitude of the signal received from each transmitter, a signature of this signal, then in storing in said central unit each signature and the corresponding position of the wheel, and, during the use the vehicle, in using a localization procedure consisting in generating, in the central unit, the signatures of the signals received from the transmitters, and in comparing each signature with the stored signatures so as to deduce therefrom the position of the corresponding wheel.

It turns out, however, that this technique requires the transmission of signals of a relatively long duration, in practice of the order of the time required to achieve one wheel revolution at slow speed, in order to obtain a significant comparison of the signatures.

Accordingly, the localization method cannot be carried out by using, for the purpose of generating the signatures intended to be compared with the stored signatures, the data frames transmitted periodically, when running, via the electronic modules, comprising the code for identifying said electronic modules and the data representative of the measured operating parameters.

The transmission duration of each of these data frames turns out, in effect, to be much too short to allow a significant comparison of the transmitted signal with the stored signatures.

The solution, for the purpose of localization the wheels, therefore consists, according to this method, in using, when the vehicle begins to run, an initial procedure dedicated to this localization, during which the electronic modules transmit not the usual data frames (identification code and measured parameters), but specific long-duration signals consisting, for example, of a carrier.

However, it turns out that, during this initial localization procedure and because of the length of transmission time, frequent collisions occur between the signals originating from the various electronic modules, so that the discrimination of the wheels by the use of this procedure is random or, at the very least, requires considerable running times.

SUMMARY OF THE INVENTION

The object of the present invention is to alleviate these drawbacks and its main objective is to provide a localization method requiring the transmission of short-duration signals, such as decoded coherent data frames, to the central unit of the vehicles.

Accordingly, the subject of the invention is a method for localization the position of wheels of a vehicle, said wheels being fitted with an electronic module suitable for transmitting, to a central unit mounted on the vehicle, signals representative of parameters of operation of each wheel, said localization method comprising a preliminary phase of storing in the central unit, for each wheel, an image, over a wheel revolution, of the intensity of the signal received by said central unit originating from the electronic module fitted to said wheel.

According to the invention, this localization method consists, during the use of the vehicle:

in ordering the emission by each electronic module mounted on a wheel of a sequence of n signals emitted with predetermined time intervals, in computing, for each sequence of n signals, the temporal variation of the correlation coefficients between each signal of said sequence and each of the stored images, in computing the peak of correlation of the correlation coefficients of each of the n signals, and in determining the temporal position over a wheel revolution of each of said n peaks of correlation so as to deduce therefrom the time intervals separating the various peaks, and in selecting, for each stored image, the wheel at the origin of the emission of sequences of n signals having the highest peaks of correlation associated with time intervals corresponding to the time intervals separating the emissions of the n signals of the sequences of signals.

The method according to the invention consists in correlating an entire sequence consisting of several signals each representative of a portion of one of the stored images, said signals being received at different time intervals.

On this basis, localization is carried out by using two main functions:

a first function of computing the temporal variation of the correlation coefficients, and a second function of estimating the peak of correlation and of its temporal position in the received sequence.

The first function consists in computing, for a sequence, the temporal variation of the correlation coefficients between each received signal and the complete image of each wheel, a computation consisting, based on a measurement of the speed of the vehicle during the emission of the sequences of signals, in normalizing in one and the same time base each portion of transmitted image and each stored image, for the purpose of comparing the latter via a method equivalent to "translating the portion of transmitted image along the stored image".

The second function consists, for its part, in computing the peaks of correlation of the correlation coefficients, and their temporal position for each complete image adapted over a wheel revolution.

In practice, it has been found that this method made it possible to obtain a considerable margin of correlation between each wheel to be located and the other wheels, and this was so from relatively low speeds of the vehicles.

Moreover, the duration of each of the n signals of a sequence turns out to be notably reduced relative to the duration of the signals required by the use of the localization method described in the preamble of the present application.

It has therefore been found that the duration necessary for the transmission of the usual data frames (identification code and measured parameters) was sufficient of obtaining an effective localization procedure, in return for the emission of sequences comprising n successive frames, where n is for example equal to 2 or 3.

Accordingly, and advantageously, localization is carried out, according to the invention, during the emission, by each electronic module mounted on a wheel, of a sequence of n data frames comprising the identification code of said electronic module and the data representative of the measured operating parameters.

Therefore, this localization does not require the emission of specific signals delivered during a procedure dedicated to localization.

According to one advantageous application designed to confirm in a redundant manner the results obtained:

the central unit is fitted with two antennas adapted to capture signals of different intensities originating from the electronic modules of the different wheels of the vehicle, and/or having different electromagnetic properties, and the localization of the wheels is determined based on the analysis of the signals captured by the two antennas.

As an advantageous example, the two antennas of the central unit may therefore be physically offset by 90°, and/or consist of an electrical antenna and a magnetic antenna.

Moreover, during the use of two antennas, a signal representative of the difference of the two signals received simultaneously by the two antennas is computed and the localization of the wheels is determined based on the analysis of said signal. The use of such a resultant signal leads, specifically, to removing the tolerances associated with the set of parameters.

BRIEF DESCRIPTION OF THE DRAWING FIGURES

Figure 3:
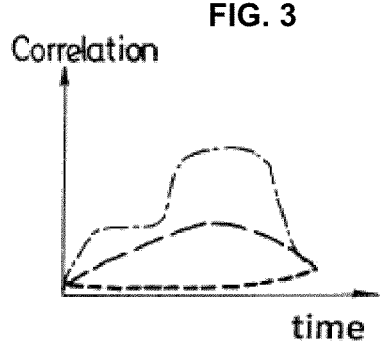
Figure 2:
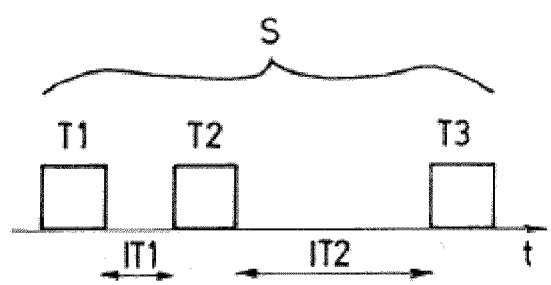
Figure 4:
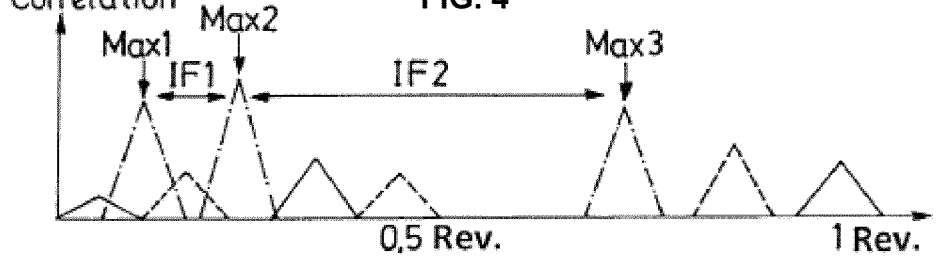

Other features, objects and advantages of the invention will emerge from the following detailed description with reference to the appended drawings which represent as a nonlimiting example a preferred embodiment thereof. In these drawings:

FIG. 1 is a schematic view from above of a vehicle equipped with a monitoring system capable of allowing the application of the localization method according to the invention, FIG. 2 is a diagram representative of a sequence S of emission of three signals, FIG. 3 is a graphic representative of the temporal variations of the correlation coefficients obtained during the reception of a signal originating from three different wheels, by means of the first function for computing the temporal variation of the correlation coefficients, and FIG. 4 is a graphic representative of the peaks of correlation obtained, for three different wheels, by means of the second function for estimating the peaks of correlation and their temporal position.

DETAILED DESCRIPTION OF THE INVENTION

The vehicle 1 shown in FIG. 1 is equipped with four wheels conventionally fitted with a tire:

two front wheels 2, 3, and two rear wheels 4, 5.

This vehicle 1 is fitted with a monitoring system conventionally comprising, in the first place, associated with each wheel 2-5, an electronic module 6-9, for example secured to the rim of said wheel so as to be positioned inside the casing of the tire.

Usually, each of these electronic modules 6-9 incorporates, for example, sensors dedicated to measuring parameters, such as pressure and temperature of the tire, said sensors being connected to a microprocessor-based computing unit connected to an RF transmitter connected to an emitting antenna. As shown in FIG. 2, each of these electronic modules 6-9 is also programmed to emit periodically sequences S of n signals, in the example three identical signals T1-T3, emitted at predetermined time intervals IT1, IT2, and each consisting of a frame of data representative of the identification code of the electronic module and of parameters measured by the sensors.

As shown in FIG. 1, the monitoring system also comprises a centralized computer or central unit 10 situated in the vehicle 1, comprising a microprocessor and incorporating an RF receiver fitted in the example with two antennas 11, 12 offset physically by 90°, so as to capture signals of different intensity originating from each of the four electronic modules 6-9, and optionally having different electromagnetic properties.

The central unit 10 also comprises means for measuring the intensity of the electromagnetic signals emitted by the electronic modules 6-9 and received by said central unit.

These measurement means comprise an output of the RSSI ("Receiver Signal Strength Indicator") type, capable of allowing the analysis of the intensity of the electromagnetic signals received by the RF receiver of the central unit 10, this analysis function being managed by said central unit by means of an analog/digital port for said RSSI output.

Usually, such a monitoring system and notably its central unit 10 are designed so as to inform the driver of any abnormal variation of the parameters measured by the sensors associated with the wheels 2-5.

Accordingly, the central unit 10 is notably programmed to make it possible to associate with each signal received by the latter an item of information concerning the position of the wheel 2-5 fitted with the electronic module 6-9 that is at the origin of this signal.

For the purpose of this localization operation, the method according to the invention consists, in a preliminary phase, in storing, in the central unit 10, for each wheel 2-5, an image, over a wheel revolution, of the intensity of the signal received by said central unit originating from the electronic module 6-9 fitted to said wheel.

Subsequently, when the vehicle 1 is running, this localization method consists, following the emission by an electronic module 6-9 mounted on a wheel 2-5, of a sequence S of three signals T1-T3 emitted at time intervals IT1, IT2:

in computing three resultant signals representative, for each emitted signal, of the difference of the two signals received simultaneously by the two antennas 11, 12, in computing the temporal variation of the correlation coefficients between each resultant signal of said sequence and each of the stored images. The results of this computation are shown in FIG. 3 which represents the variations computed for signals originating from three different wheels 2-5. The variations are shown for one wheel by a line drawn with long dashes, for the second wheel by a line drawn with shorter dashes and for the last wheel by a line consisting of mixed dots and dashes, in computing the peak of correlation Max1-Max3 of the correlation coefficients of each of the three resultant signals, and in determining the temporal position over a wheel revolution of each of said n peaks of correlation so as to deduce therefrom the time intervals IF1, IF2 separating the various peaks. The results of this computation are shown in FIG. 4 which represents the peaks of correlation and the time intervals computed for sequences of signals originating from three different wheels 2-5. The peaks of correlation are represented for one wheel by a continuous line, for the second wheel by a line drawn with dashes and for the third wheel by a line consisting of mixed dots and dashes, and in selecting, for each stored image, the wheel 2-5 that is at the origin of the emission of sequences S of three resultant signals showing the highest peaks of correlation Max1-Max3 associated with time intervals IF1, IF2 corresponding to the time intervals IT1, IT2 of emission of the n signals of the sequences of signals. In this example, it is the third wheel which is shown by a line of mixed dots and dashes.

Such a localization procedure notably has the essential advantage of not requiring the emission of specific signals delivered during a procedure dedicated to localization.

The invention claimed is:

1. A method for localization a position of wheels of a vehicle, said wheels being fitted with an electronic module suitable for transmitting, to a central unit mounted on the vehicle, signals representative of parameters of operation of each wheel, said localization method comprising:
   a preliminary phase of storing in the central unit, for each wheel, an image, over a wheel revolution, of intensity of signal received by said central unit originating from the electronic module fitted to said wheel; and
   said localization method comprising, during a use of the vehicle:
      ordering emission by each electronic module mounted on a wheel of a sequence of n signals emitted with predetermined time intervals, wherein n is an integer greater than 1,
      computing, for each sequence of n signals, a temporal variation of correlation coefficients between each signal of said sequence and each stored image,
      computing a peak of correlation of the correlation coefficients of each of the n signals, and determining a temporal position over a wheel revolution of each peak of correlation so as to deduce therefrom time intervals separating various peaks, and
      selecting, for each stored image, a wheel at an origin of the emission of sequences of n signals having the highest peaks of correlation (Max1-Max3) associated with time intervals corresponding to the time intervals of emission of the n signals of the sequences of signals.

2. The localization method as claimed in claim 1, wherein each sequence of n signals consists of a sequence of n data frames comprising an identification code of the electronic module and data representative of measured operating parameters.

3. The localization method as claimed in claim 1, wherein:
   the central unit is fitted with two antennas adapted to capture signals of different intensities originating from electronic modules of different wheels of the vehicle, and/or having different electromagnetic properties, and
   localization of the wheels is determined based on an analysis of the signals captured by the two antennas.

4. The localization method as claimed in claim 3, wherein a signal representative of a difference of two signals received simultaneously by the two antennas is computed and a location of the wheels is determined based on an analysis of the computed signal.

5. The localization method as claimed in claim 2, wherein:
   the central unit is fitted with two antennas adapted to capture signals of different intensities originating from electronic modules of different wheels of the vehicle, and/or having different electromagnetic properties, and
   the localization of the wheels is determined based on an analysis of the signals captured by the two antennas.

6. The localization method as claimed in claim 3, wherein a signal representative of a difference of two signals received simultaneously by the two antennas is computed and a location of the wheels is determined based on an analysis of the computed signal.

* * * * *